Patented June 17, 1947

2,422,544

UNITED STATES PATENT OFFICE 2,422,544

N-(2-HYDROXY-ETHYL)-ETHYLENEDI-AMINE DISALT OF 2.6-DINITRO-4-CYCLOHEXYL-PHENOL

John N. Hansen, Albert Lea, Minn., and Frank B. Smith, Midland, Mich., assignors to The Dow Chemical Company, Midland, Mich., a corporation of Michigan No Drawing. Application September 10, 1945, Serial No. 615,508

1 Claim. (Cl. 260—567.5)

This invention relates to amine salts of phenols and is particularly concerned with the N-(2-hydroxy-ethyl)-ethylenediamine disalt of 2.6-dinitro-4-cyclohexyl-phenol having the formula

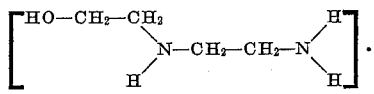

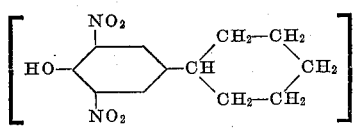

This compound has been prepared and found to be a crystalline solid difficultly soluble in water and somewhat soluble in many organic solvents. It is relatively stable to light and air, not appreciably affected by carbon dioxide, and yellow to orange-red in color.

The compound may be prepared by reacting N-(2-hydroxy-ethyl)-ethylenediamine with 2.6-dinitro-4-cyclohexyl-phenol. The reaction is conveniently carried out by contacting solutions of the two reactants in benzene, petroleum ether, alcohol, or other suitable solvent. From 2 to 3 molecular proportions of the phenol are employed for each molecular proportion of amine.

The reaction can be carried out at any desired temperature up to the decomposition temperature of the reaction mixture. Good results are obtained and minimum amounts of solvent required at temperatures of between 60° and 120° C. When the reactants or solutions thereof are reacted together, the insoluble addition salt crystallizes out of the mixture. The formation of this salt is generally complete within about one hour after the reactants are combined. To insure the formation of a relatively homogeneous product and to minimize occlusion, the solution of amine is preferably added portionwise to the solution of phenol with stirring over a short period of time. This also permits a close control of the reaction temperature whereby decomposition due to excessive heat of reaction is avoided. Following completion of the reaction, the solid salt compound is separated by filtration and may be further purified by recrystallization if desired.

In a representative operation, 2 mols of 2.6-dinitro-4-cyclohexyl-phenol was dissolved in methyl alcohol. A solution of 1 mol of N-(2-hydroxy-ethyl)-ethylenediamine in methyl alcohol was added portionwise and with mixing to the solution of the phenol at substantially the boiling temperature of the reaction mixture and under reflux. After all of the amine solution had been added, the mixture was stirred for about one hour and thereafter cooled to below room temperature. The product was then filtered and the residue dried to obtain a substantially quantitative yield of the N-(2-hydroxy-ethyl)-ethylenediamine disalt of 2.6-dinitro-4-cyclohexyl-phenol as a yellow crystalline compound melting at 147°–150° C. This salt is substantially insoluble in water and very difficultly soluble in petroleum oil and 95 per cent ethanol.

The compound as described above has been employed in various dust and spray compositions as a principal toxicant for the control of agricultural insect and fungus pests. It has been found particularly advantageous for use because of its non-phytocidal character, whereby it may be applied to the surfaces of growing plants in amounts sufficient to control parasites without causing injury to the plant tissue.

This invention is a continuation-in-part of our co-pending application Serial No. 391,093, filed April 30, 1941, and issued October 2, 1945, as Patent No. 2,385,848.

We claim:
N-(2-hydroxy-ethyl)-ethylenediamine disalt of 2.6-dinitro-4-cyclohexyl-phenol.

JOHN N. HANSEN.
FRANK B. SMITH.

REFERENCES CITED

The following references are of record in the file of this patent:

UNITED STATES PATENTS

| Number    | Name            | Date           |
|-----------|-----------------|----------------|
| 2,222,486 | Moore           | Nov. 19, 1940  |
| 2,225,619 | Britton et al. (I) | Dec. 24, 1940 |
| 2,225,618 | Britton et al. (II) | Dec. 24, 1940 |
| 2,385,719 | Migrdichian     | Sept. 25, 1945 |
| 2,385,848 | Smith et al.    | Oct. 2, 1945   |
| 2,362,464 | Britton (III)   | Nov. 14, 1944  |